UNITED STATES PATENT OFFICE.

RUDOLF TAMBACH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

EXTRACT OF ERGOT.

1,004,499.  Specification of Letters Patent.  Patented Sept. 26, 1911.

No Drawing.  Application filed December 12, 1908.  Serial No. 467,259.

*To all whom it may concern:*

Be it known that I, RUDOLF TAMBACH, manufacturing chemist, a subject of the German Emperor, residing at Ludwigshafen-on-the-Rhine, Germany, have invented a certain new and useful Extract of Ergot, of which the following is a specification.

The great medicinal importance which ergot possesses has led to numerous chemical investigations, the results of which in part clash with each other and have not yet led to any perfect clearness in this complicated subject. Recently Barger and Carr, (*Journ. Chem. Soc.* XCI, 1907, p. 337) and Barger and Dale (*Chem. Ztbl.* 1907, I, p. 279), have elucidated some of these contradictions and have brought about a considerable simplification of the nomenclature and of the pharmacological valuation of the components of ergot, but even they come to the conclusion (see *Bio-Chemical Journal*, 1907, Vol. II, p. 296), that "the action of the extracts of the pharmacopœia seems to be too great for them to be due to the small quantity of ergotoxin which is contained in them, (prepared in a pure state by Barger & Carr); it is much more likely that there is some other active principle present." As to the nature of this active principle, however, we are still completely in the dark.

It is known, that ergot and its extracts soon decompose, so that they usually are not permitted to be kept in chemist's shops longer than one year. Even within this period, however, their efficiency decreases considerably and their therapeutic action is not certain.

It has now been found that a product which keeps well and has the full effect of the fresh drug can be obtained if the aqueous extract of ergot from which the grease has been removed is exhaustively treated after being neutralized and concentrated, with strong alcohol and ether. In this treatment inactive extractive substances separate out (together with very small quantities of active substance), while the main portion of the active substance passes over into the alcohol-ether solution. From this solution by concentration and drying, preferably *in vacuo* and after admixture with milk sugar or other suitable substances, a handy preparation can be obtained, which can be adjusted to any definite strength. The extracts from one kilogram of ergot are concentrated to 250 cubic centimeters and treated with 1¼ liters of alcohol and 4 or 5 liters of ether.

Example. 10 kg. of pulverized and degreased ergot are extracted several times with 20 liters of warm water each time, the extracts neutralized with alkali and concentrated *in vacuo*. The residue is taken up in as little water as possible, made faintly alkaline with some bicarbonate, and mixed with alcohol and ether as long as a precipitate continues to form; the separated matter is then filtered off. The solvents are removed from the filtrate in a vacuum; the residue after admixture with milk sugar is brought to dryness and into the form of powder.

The preparation thus obtained forms a grayish-white powder soluble in water and which with further quantities of milk sugar can be adjusted to definite degrees of strength.

The preparation is almost insoluble in alcohol, ether, and petroleum spirit. In aqueous solution it yields, upon the addition of iodized sodium iodid solution, a slight precipitate; but when acidulated it yields a brown precipitate; upon the addition of picric acid solution it yields a slight precipitate, which is soluble in ammonia with red coloration; upon the addition of silver nitrate solution it yields a whitish-yellow precipitate, which is soluble in ammonia with red coloration; upon the addition of bromine water it yields a white gelatinous precipitate; upon the addition of ferric chlorid solution it yields a precipitate which is soluble in ammonia with Bordeaux-red coloration; and upon the addition of sulfate of copper solution it yields a whitish gray precipitate, which dissolves, on the addition of ammonia with red coloration and on acidulation forms a gelatinous mass, and upon the addition of mercury iodid in acidulated solution a whitish precipitate.

What I claim is:—

1. The process of preparing an extract of ergot which comprises neutralizing and concentrating an aqueous extract of the said drug, and adding to it alcohol and ether as long as a precipitate is formed by such addition, substantially as described.

2. The process of preparing an extract of ergot which consists in preparing an aqueous extract of ergot, neutralizing the extract with alkali, concentrating the same, gradually adding alcohol and ether, as long as the said addition produces a precipitate, filtering the resulting liquid from the precipitate, concentrating the same by evaporation, adding milk sugar and drying, substantially as described.

3. As a new product derived from ergot, a grayish-white powder, almost insoluble in alcohol, ether and petroleum-spirit, easily soluble in water, the said product in aqueous solution yielding with iodized sodium-iodid solution a slight precipitate, but when acidulated yielding a strong brown precipitate, with mercury iodid in acidulated solution a whitish precipitate, with picric acid solution a slight precipitate soluble in ammonia with red coloraton, with silver nitrate solution a whitish-yellow precipitate soluble in ammonia with red coloration, with bromin-water a white gelatinous precipitate, with ferric chloride solution a precipitate soluble in ammonia with Bordeaux-red coloration, with sulfate of copper solution a whitish gray precipitate which dissolves on the addition of ammonia with red coloration and on acidulation forms a gelatinous mass.

In testimony whereof I have hereunto set my hand in presence of two subscribing witnesses.

RUDOLF TAMBACH.

Witnesses:
H. TAEGER,
JOS. H. LEUTE.